United States Patent [19]

Rickett et al.

[11] Patent Number: 4,618,052
[45] Date of Patent: Oct. 21, 1986

[54] CONVEYING APPARATUS

[75] Inventors: Roger G. Rickett, Turners Hill; Eric Spooner, Crawley, both of United Kingdom

[73] Assignee: Metal Box Public Limited Company, United Kingdom

[21] Appl. No.: 742,638

[22] Filed: Jun. 10, 1985

Related U.S. Application Data

[63] Continuation of Ser. No. 425,774, Sep. 28, 1982, abandoned.

[30] Foreign Application Priority Data

Jan. 29, 1982 [GB] United Kingdom ................. 8202650

[51] Int. Cl.⁴ ............................................. B65G 47/26
[52] U.S. Cl. .................................... 198/370; 198/439
[58] Field of Search .............. 198/439, 472, 690, 366, 198/370

[56] References Cited

U.S. PATENT DOCUMENTS

| | | | |
|---|---|---|---|
| 2,838,160 | 6/1958 | Rouse | 198/439 X |
| 3,167,168 | 1/1965 | Park | 198/439 |
| 3,285,386 | 11/1966 | Corman | 198/439 X |

Primary Examiner—Joseph E. Valenza
Assistant Examiner—Dennis Williamson
Attorney, Agent, or Firm—Sughrue, Mion, Zinn, Macpeak and Seas

[57] ABSTRACT

A lane divider for the conveying of can body cylinders maintains the cylinders in line-ahead formation and in a predetermined orientation, e.g. with their welded side seams uppermost, by maintaining a positive hold on each cylinder at all times during its travel along a feed path and during transfer from the feed path to, and subsequent travel along, a plurality of downstream paths selected by a sequential control unit responsive to the arrival of a cylinder in the feed path. Control of cylinder orientation is obtained by an array of magnets along each path; these include electromagnets in the region of the junction of the paths. Path selection is obtained by selective energisation of the electromagnets.

7 Claims, 10 Drawing Figures

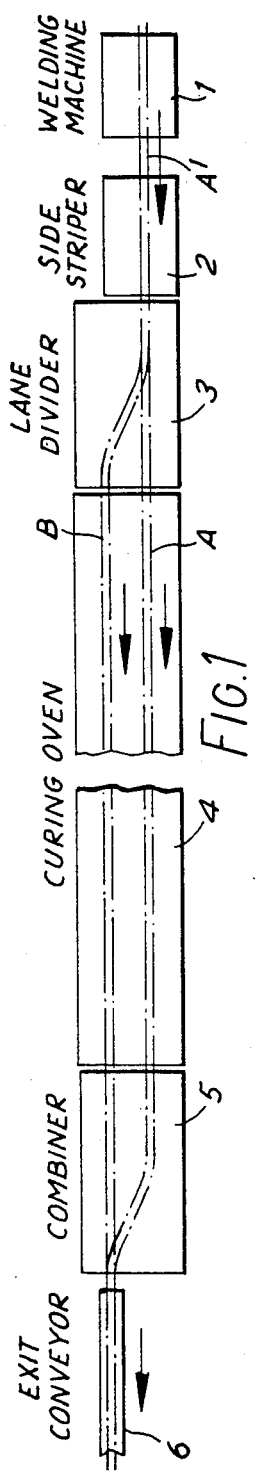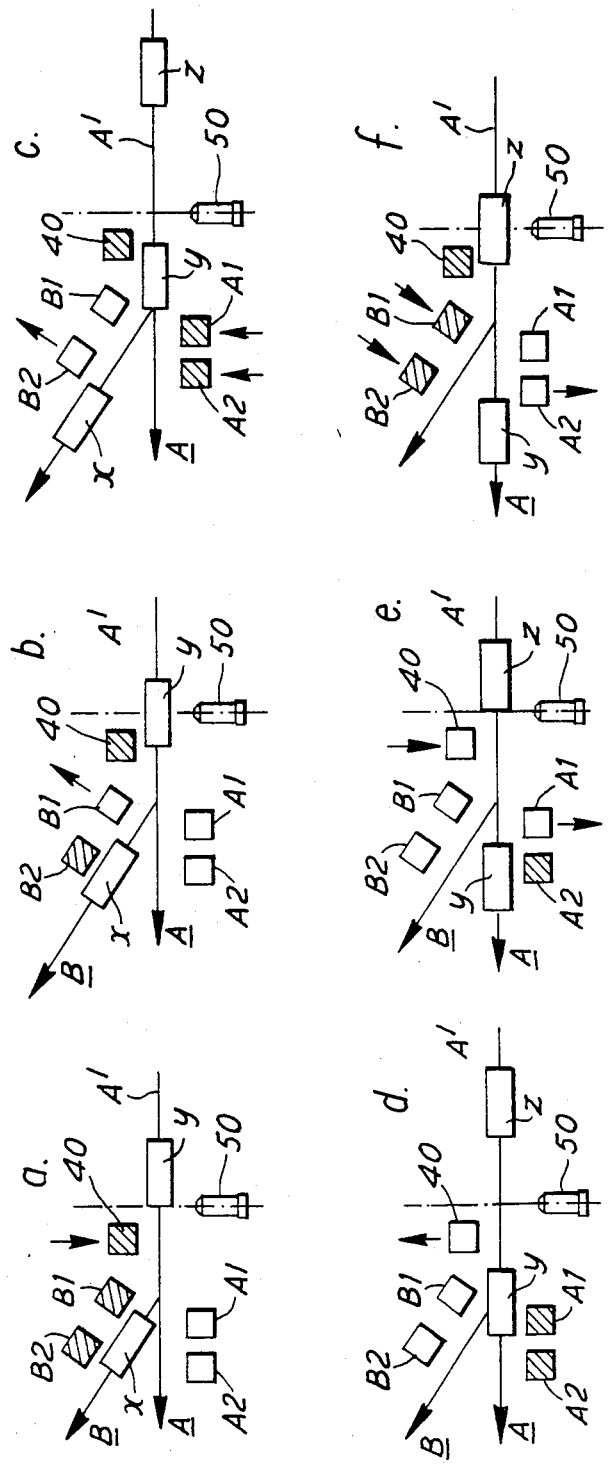

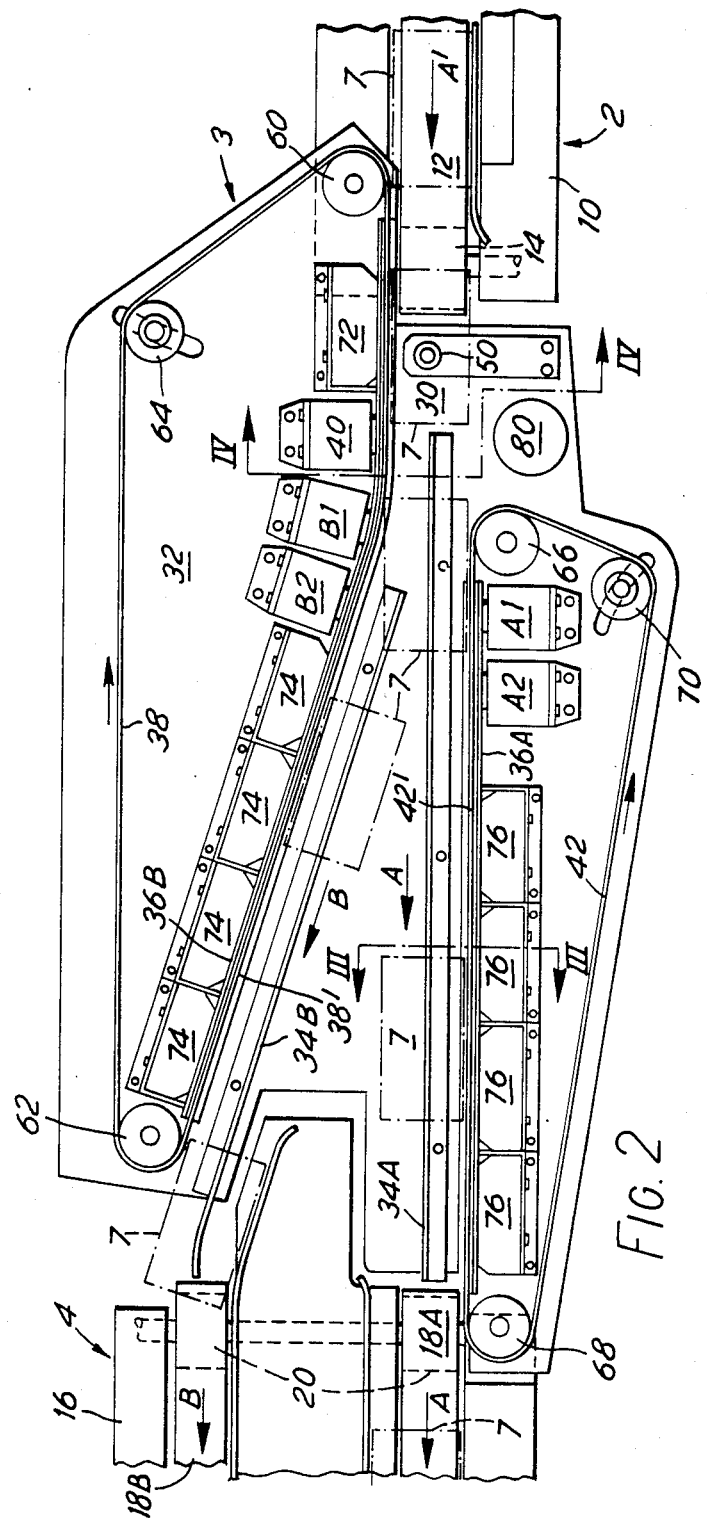

CONVEYING APPARATUS

This is a continuation, of application Ser. No. 425,774 filed Sept. 28, 1982 now abandoned.

This invention relates to mechanical conveying apparatus for guiding discrete articles between a single common path, with the articles in successive relationship, and a plurality of other paths.

Such apparatus takes the form of either a route or lane divider or a combiner. In the former case, articles initially travelling along the common path are directed or guided by the divider into the subsequent paths; whilst in a combiner, two or more paths converge into a single common path.

In many practical applications, dividers and combiners are arranged to allow the articles to be carried forward in a random order or in an orientation which is random in at least one dimension, or both. Such apparatus utilizes the shape of each article in such a way that the article will take its natural turn to move forward as soon as there is room for it to do so. In a conventional combiner this involves guiding the articles in each upstream path into a position in which they impinge upon those arriving along the other upstream path or paths. In a conventional lane divider, the downstream path selected for each article may be dependent upon its transverse position in the upstream path. Alternatively, mechanical switching means may be incorporated in the divider (such as a pivoted blade) for guiding one or more articles into one downstream path before being moved to a different position, so as to guide one or more following articles into another downstream path. A similar principle may be used in a combiner, so as to feed into the downstream path articles from first one upstream path and then another, the path from which articles are not being taken being temporarily blocked.

The above-mentioned apparatus having mechanical switching means represents one example of how, in general, dividers or combiners may be selective, as to what articles they send into which downstream path, or as to which path they select from which to take articles for onward transmission, respectively. The word "selective", as used in this specification, is to be construed in this general sense.

There is a need in certain applications for selective lane dividing during the conveying of articles, without in any way disturbing their orientation. This need exists, for example, in connection with operations on cylindrical bodies for open-top cans, of the kind having a welded side seam. It is necessary to provide, internally or externally of the can body, a layer of a protective coating (known as a side stripe) along a portion of the can body such as to cover completely the welded seam. Such coatings consist of organic substances which, after application, require curing by application of heat. This heat can be applied by passing the can bodies through an oven of the kind in which the entire body is subjected to heating for the required time. Such ovens are, however, relatively large; furthermore, if the whole of the interior of the oven is heated, as is necessary if general heating of the can body is required, there will be substantial energy losses which are wasteful. There have therefore recently been developed curing units for can body side stripes, which apply heat to the side striped area of the body only; and this heat, besides being highly localised, is applied under conditions which enable the time and temperature involved in the side stripe curing operation to be very closely controlled, thus contributing to substantially greater integrity of the finished product, as well as enabling the curing equipment to be substantially smaller and less expensive, and affording significant savings in energy. The heat is obtained by induction heating techniques.

Despite the above advantages, these induction curing ovens tend to be of considerable length. Can bodies can now, with modern machinery, have their side seams welded at great speeds, and the side striping applicator equipment, to which the can bodies are passed after leaving the welding machine, is capable of matching the speed and throughput of the latter. In order to effect localised curing of the side stripe in an induction curing oven, the can bodies must be passed through the oven with the side stripe presented to the heat source in the correct orientation, which in turn means that their orientation must be controlled at all times between entering the welding machine and leaving the curing oven. A common conveyor, or series of linked conveyors all operating at speeds which may be the same, but which will in any event bear a predetermined relationship to each other (e.g. with the curing oven conveyor running faster than those preceding it), will therefore normally be provided. The length of the curing oven is dependent, not only on the temperature required for the curing oven, but also on the forward velocity of the conveyor which carries the can bodies through it, since this will determine the duration of the curing process for an oven of a given length.

It is possible to achieve further savings in heat losses and in raw material usage, and therefore in the capital and operating costs of the induction curing oven, if the oven has two or more parallel paths through it for the can bodies. This will not only enable the length of the oven to be very substantially reduced (at the price of an increase in its width), thus enabling siting of the oven to be more easily and conveniently determined, but also enables the forward velocity of each oven conveyor to be reduced, as compared with the case of a single-lane conveyor, by a factor related to the number of lanes chosen. This in turn may reduce the need for high-speed components such as bearings, and will tend also to reduce maintenance requirements.

It will be realised from the foregoing, that there will be other industrial applications also, in which highspeed machinery delivers components for subsequent operations which can advantageously be carried out at a lower speed but which call for pre-determined orientation of the components. In all such applications, as in the case of can body side stripe curing, a lane divider capable of handling components at a high input speed, whilst positively maintaining their required orientation, is needed.

Accordingly, the invention provides mechanical conveying apparatus for selectively guiding discrete articles of magnetisable material between a single common path, with the articles in successive relationship, and a plurality of other paths, the apparatus having guide means defining the said single path and the said other paths, including a path junction region common to all of the paths, and article-advancing means associated with the various paths for urging the said articles along them, wherein magnetic holding means are provided such as positively to maintain each article in a predetermined orientation throughout its travel through the apparatus, the magnetic holding means including, at least at the path junction region, at least one controllable magnet arranged to be activated and de-activated selectively, so that when it is activated, its magnetic field extends into a local region of influence in the associated path or paths whereby to influence any said article or part thereof in that local region; and the apparatus further including sequencing means synchronised with the article-advancing means for activating and de-activating said controllable magnet or magnets, whereby to select according to a predetermined sequence each in turn of the said other paths for transfer of an article or batch of articles between it and the said single path.

The or each controllable magnet is preferably an electromagnet, though other means may be provided for activating the controllable magnets. The term "activated" has in this specification the meaning set forth above, viz. that it exerts a magnetic field in a local region of influence in the associated path or paths such as to influence an article, or part thereof, of magnetisable material, in that region. Thus, by way of example, the (or each) controllable magnet may be in the form of a permanent magnet mounted on an arm, the arm being pivoted for movement between two positions. In one of these positions, viz. the activated position, the magnet is close to the path; whilst in the de-activated position it is swung out so that its field will not influence significantly any article in the associated "region of influence" mentioned above.

The article-advancing means may be mechanical in nature. In preferred embodiments, it comprises a plurality of article-engaging elements, movable forward to urge the articles along the said paths, each of the said other paths having at least one said article-engaging element. It is, however, also possible to incorporate such a device as a linear electric motor in place of movable, mechanical article-engaging elements. Another alternative form of article-advancing means may be provided by the magnetic holding means themselves. In such an arrangement, controllable magnets (preferably electromagnets) are arranged at suitable intervals along each path and activated one after another in the direction of travel of the articles so as to "pull" the latter along the path.

Where the magnetic holding means are separate from the article-advancing means, however, the former may be associated with the latter so as to hold the articles in contact with the article-engaging elements which advance the articles. Such an arrangement is preferred where, for example, the articles are of relatively light weight, as is the case with steel can bodies.

Mechanical conveying apparatus according to the invention, as thus far described, is preferably in the form of a route (or "lane") divider for transferring the articles from the common single path selectively to the said other paths downstream of the common path. In the context of a divider, the common single path will be referred to hereinafter, when convenient to do so, as the "feed path", and the other paths as the "downstream paths".

It will be realised that the apparatus according to the invention may alternatively take the form of a combiner, in which form it finds industrial application where components received along two or more paths from one operation are required to be transmitted along a single common path for an operation which is to take place at a higher speed, without the orientation of the articles being disturbed between the first and second operations.

Where the apparatus consists of a divider, it preferably includes article-sensing means associated with the common path and coupled to the sequencing means, the latter being responsive to the article-sensing means so that arrival of an article at the article-sensing means initiates an appropriate step in the said sequence. The article-sensing means may take the form of a proximity sensor which transmits an electrical signal to the sequencing means when it detects the presence of an article. Alternatively it may be a photo-electric device or (since the articles are of magnetic material such as steel) a magnetic device. The sensing means may, when the articles to be conveyed are of a suitable nature, be in the form of a trigger or similar device actuated by contact with the article, so as to operate the sequencing means mechanically. If the sequencing device is electrical or electronic, as it is in preferred embodiments of the invention, such a mechanical sensor will actuate the sequencing device electrically. The sequencing device may on the other hand comprise a mechanical linkage; this is particularly applicable in a case, such as that mentioned above, in which the controllable magnets are in the form of permanent magnets on pivoted arms.

Preferably, at least one controllable magnet is a master magnet, so located that its local region of influence is the path junction region. The choice as to number and position of the controllable magnets is dependent on various factors, such as the size, mass, shape, and speed of advance of the articles; the likely spacing between them; the geometry of the paths, i.e. how many paths are to be joined to the single common or feed path, the angles of divergence or conveyence between them; and so on. However, in preferred embodiments of the invention, either or both of two layouts involving further controllable magnets may be adapted, each involving a master magnet as mentioned above. According to one of these layouts, a further controllable magnet is so disposed, with respect to at least one of the downstream paths, that its local region of influence comprises a portion of that downstream path and is sufficiently close to the path junction region for an article to enter the said portion of the downstream path whilst still partly in the path junction region. The other layout calls for at least one of the downstream paths of a divider to have, associated with it, mechanical article-advancing means extending rearwardly sufficiently to engage an article in the path junction region. A controllable magnet is then, in this layout, so disposed, with respect to a downstream path having associated with it a said mechanical article-advancing means, that its local region of influence is entered by the leading edge of an article when the said leading edge has been carried forward out of the path junction region by the said mechanical article-advancing means.

There may of course be any desired number of controllable magnets along the various paths. Where these comprise electromagnets, it is advantageous to provide simple, fixed permanent magnets as the magnetic holding means along those parts of the paths that do not require activation or de-activation of magnets to achieve guidance of the articles into the desired downstream path.

Reverting to consideration of the article-advancing means, where the apparatus consists of a divider and the advancing means comprises a plurality of elements movable forward to urge the articles along the various paths, each such element is preferably in the form of, or carried by, an endless member arranged to be in continuous forward motion. Preferably this endless member consists of a drive belt for direct engagement with the articles. However, the elements engaging the articles may be pusher dogs or the like. Such dogs may be carried by the endless member, the latter comprising a belt, chain or cable. Alternatively, in certain applications where accuracy of orientation is required with intermittent feeding of the articles at predetermined intervals of time or distance, the pusher dogs may be arranged to reciprocate back and forth, being retractable for the return stroke so as not to foul the article to be next engaged. Such reciprocable pusher dogs are known in various arrangements in connection with the feeding of flat sheets of material to, for example, slitting or printing machines. Arrangements of this kind may be found advantageous when dealing with relatively large articles, particularly where very high speeds are not called for.

In preferred embodiments of a high-speed divider according to the invention in which endless members such as belts are employed to advance the articles, a first such endless member, associated with a first one of the downstream paths, extends rearwardly so as to provide also the article-advancing means for the common path, whereby when an article is to travel along a selected downstream path other than the said first path, the sequencing means causes the state of activation of the appropriate controllable magnet or magnets to be such that the article is transferred from the first endless member to a second endless member, to be advanced thereby along the selected path. In such an arrangement, where may be a said first downstream path and a second downstream path, the second downstream path and the feed path being (at least in the region of the path junction) straight and continuous with each other and the said second path being divergent from the other paths. The second endless member, for advancing articles along the second path, is then preferably arranged to engage an article selected for travel along the second path and to carry it forward so that the article enters the local region of influence of a controllable magnet of the second path whilst still engaged by the first endless member.

Preferably, each endless member has a course extending along the side of the corresponding path or paths so as to engage the articles laterally, the magnetic holding means being disposed immediately behind the said courses of the endless members. It will however be understood that it may sometimes be found more convenient to arrange for the endless member to engage the articles otherwise than laterally. For example, an overhead belt will engage them on an upper suface; alternatively, the endless member may be below the articles to engage their underside. Whenever the endless members are located in relation to the cross-section of the articles, the magnets may be associated with them in the manner previously mentioned, so as to tend to draw the articles into contact with the endless member or with other article-engaging elements carried thereby.

In the preferred form of the apparatus according to the invention, it is adapted for conveying steel can bodies and is a lane divider for transferring the can bodies from the common single path (which is straight) selectively to a first downstream path divergent from the common path and to a straight, second downstream path continuous with the common path. In this form, the article-advancing means preferably comprise a first article-engaging element movable forwardly along the first downstream path to urge the articles therealong, and a second article-engaging element movable forwardly along the second downstream path to urge the articles therealong, either the first or the second article-engaging element being so arranged that its forward travel comprises also the common path before the appropriate downstream path.

It will be realised that apparatus according to the invention can be readily adapted to provide a junction between a single path and more than two other paths; and that there may be several junctions, so that for example a path may split into two, then each of these two into two more, and so on.

An embodiment of the invention in its preferred form will now be desribed, by way of example only, with reference to the drawings hereof, in which:

FIG. 1 is a diagrammatic plan view illustrating the layout of a production line for steel can bodies of the built-up open-top type, having welded side seams, the production line including a lane divider which exemplifies the preferred embodiment to be described with reference to the other Figures;

FIG. 2 is a simplified plan view of the lane divider, showing also adjacent portions of conveyors associated with the divider;

FIG. 5 consists of six diagrams (a) to (f), illustrating six stages in a cycle of operation of the lane divider.

Figure 4:
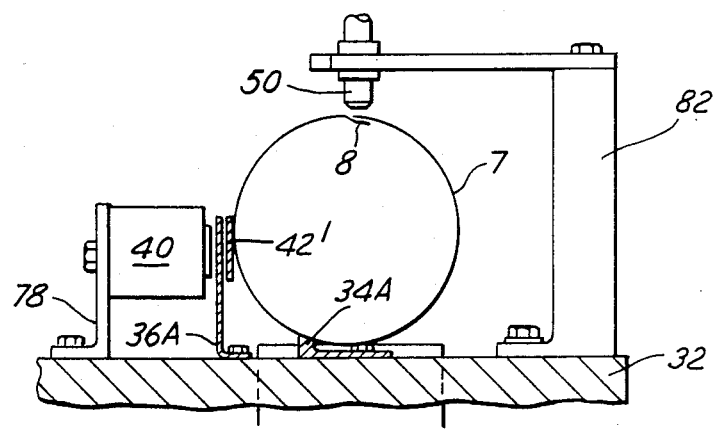
FIG. 4 is a scrap sectional elevation taken on the line IV—IV in FIG. 2.

Referring to FIG. 1, there is shown therein a production line layout in which sheets of tinplate (steel with a very thin coating of electrolytic tin), bent into the form of a cylinder with overlapping edges in the manner indicated at 8 in FIG. 4, are passed in succession into a welding machine 1, which welds along the side seam 8. From the welding machine, the cylinders pass through a side stripe applicator machine 2, and thence to a lane divider 3 which divides the single line of cylinders (one of which is indicated at 7 in FIG. 4), delivered along a path A' through the welding machine 1 and side stripe applicator 2, into two lines. The first of these lines is diverted along a path B, whilst the remainder are conveyed, in parallel with the path B, along a path A, which in this example is collinear with the path A. The paths A and B extend through an induction type side stripe curing oven 4. Upon leaving the curing oven 4, the two lines A and B of cylinders 7 are combined by a combiner 5 into a single line once again, to be removed by an exit conveyor 6. The combiner 5 may be of any suitable known kind. The lane divider 3 is the apparatus which will now be described.

Referring now to FIG. 2, the lane divider 3 is shown in close proximity with portions of the side stripe applicator 2 and of the induction curing oven 4. The side stripe applicator 2 has a frame 10 carrying a horizontal conveyor belt 12 which serves as feed conveyor for the lane divider. The conveyor belt 12 is driven by a belt drum 14. A side belt 16 is in continuous forward movement in the direction of the arrow A', as is the belt 12, these two belts being driven at the same forward speed. A succession of the can body cylinders 7 (which in FIG. 2 are indicated by phantom lines) is driven by the belts 12 and 16 through the side stripe applicator 2, and maintained in an orientation in which its welded seam 8 is uppermost by means not shown, whilst a side stripe as applied along the seam both internally and externally of the body cylinder. The side stripes are indicated in FIG. 3 at 9.

The induction curing oven 4 has a main frame 16 carrying two horizontal conveyor belts 18A and 18B, parallel to each other and serving as exit conveyors for the lane divider along the paths A and B respectively. Each of these conveyor belts is driven by a drum 20, the drums 20 being driven at the same forward speed. The can body cylinders 7 are advanced by the conveyor belts and the side belts through the curing oven with their side seams 8 still uppermost, heat being applied to the side seams to cure the lacquer composition of the side stripes.

It will be seen from FIG. 2, from the positions of the can body cylinders 7 indicated thereon, and the arrows A and B indicating their directions of forward travel, that the path A is defined to the left of a path junction region generally indicated at 30. This is the region where the single, common feed path A' changes to the path A, downstream of path A' and continuous with it, and from which the downstream path B diverges from the feed path, the region 30 thus being common to (and it is considered to be part of) all three paths.

Figure 3:
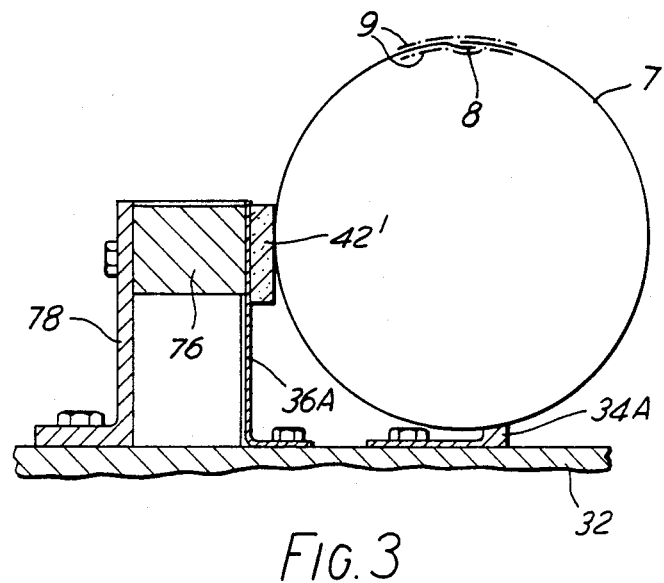
FIG. 3 is a scrap sectional elevation taken on the line III—III in FIG. 2.

Referring now to all of FIGS. 2 to 4, the lane divider has a main frame, not shown, which includes an upper portion simplified in the drawings to a simple, rigid base plate 32. The base plate 32 has fixed to it a bottom guide rail 34A for supporting can body cylinders 7 in the path A, and a bottom guide rail 34B for supporting can body cylinders in the path B. Also fixed to the baseplate, and parallel to the bottom guide rails 34A and 34B respectively, are upstanding belt guides 36A and 36B. Along the belt guide 36B there passes a cylinder-engaging course 38' of an endless belt 38, driven by a drive drum 60 and extending also around idler drums 62 and 64. The drive drums 60 and 62 are at the extreme upstream end of the lane divider, and at its extreme downstream end in the lane B, respectively. The idler drum 64 is adjustable to enable the tension in the belt 38 to be adjusted.

Similarly, along the belt guide 36A there passes a cylinder-engaging course 42' of an endless belt 42, driven by a drive drum 66 and extending also around idler drums 68 and 70. The drive drum 66 is near the upstream end of the path A whilst the idler drum 68 is at the extreme left hand end of the lane divider in path A. The idler drum 70 is adjustable in the same manner as the drum 64.

The various belt drive drums are all mounted for rotation on vertical axes on the baseplate 32. The drive drums 60 and 66 are coupled, though mechanical coupling means and gearing (not shown), with a drive unit, not shown, of the lane divider, which is controllable so that the side belts 38 and 42 can be driven continuously at exactly the same forward velocity as the side striper conveyor belt 12. The drive unit of the lane divider, which incorporates an electric motor, is mounted in the main frame below the baseplate 32.

The side belts 38 and 42, as can be seen from FIGS. 3 and 4, engage the can body cylinders laterally, and their function is to serve as can body cylinder advancing means. It will be observed that, whereas the second belt 42 is associated only with the path A, the first belt 38 is associated with both of the paths A' and B, extending rearwardly for this purpose.

Immediately behind each of the fixed belt guides 36A and 36B, and extending over substantially the length of each of them, is an array of magnets, the main purpose of which is to serve as a holding means, such as positively to maintain each can body cylinder 7 in contact with the respective course 38' or 42' of the side belts and to ensure that the cylinder 7 remains in its predetermined orientation in which the welded side seam 8 remains uppermost at all times. The array of magnets associated with the drive belt 38 comprises, considered in the direction of travel of the can body cylinders, a permanent magnet 72 associated with the feed path A, a master magnet 40, a magnet B1, a magnet B2, and a set of permanent magnets 74. Behind the fixed belt guide 36A, the array of magnets, considered again in the direction of travel, comprises a magnet A1, a magnet A2, and a set of permanent magnets 76. All of the various magnets are fixed, for example by brackets 78, to the baseplate.

The master magnet 40 and the magnets A1, A2, B1 and B2 are all controllable in the sense that each one can be activated or de-activated as required. In this example, these five magnets are electromagnets. They are supplied with power through a sequencing device in the form of a sequential control unit indicated diagrammatically at 80. The mode of operation of the sequential control unit and of the electromagnets 40, A1, A2, B1, B2 will be described hereinafter.

It will be observed that the master electromagnet 40 is positioned at the path junction region 30, whilst the electromagnets B1 and B2 are positioned along the entry portion of the path B, and the electromagnets A1 and A2 being a little way downstream of the entry of the path A. The first electromagnet (B1) of path B is sufficiently close to the junction region 30 for a can body cylinder 7 to enter the entry portion of path B whilst still partly in the junction region. Thus if the master electromagnet 40 is energised, so as to influence a body cylinder in the region 30, the cylinder will still be under its influence when it comes within the region of influence of the electromagnet B1; so that if the latter is energised, it will cause the cylinder 7 to continue to engage the side belt 38 and so be diverted into path B, its orientation with the welded side seam 8 uppermost being maintained by virtue of its continuously being held by the electromagnets. The electromagnet B2 serves to continue this positive holding action as the cylinder 7 advances further, and the permanent magnets 74 have the same effect subsequently.

The drive roller 66 of the side belt 42 associated with path A is so positioned that the belt 42 extends rearwardly by a sufficient amount to engage the leading end of a can body cylinder 7 destined to travel along path A whilst part of the body cylinder is still in the path junction region 30. In this connection it should be mentioned that the region 30 may be considered as that region in which the master electromagnet 40, when energised, exerts sufficient lateral force on the can body cylinder to hold it positively against the side belt 38. The leading edge of the cylinder first engages the belt 42 at a point on the latter a little way upstream of the first electromagnet A1 associated with path A, so that it may be carried forward out of the junction region 30 by the belt 42 before entering the region of influence of the electromagnet A1. The electromagnets A1 and 40 are however sufficiently powerful to ensure that, during this movement, the orientation of the body cylinder is preserved by the master electromagnet 40. As will also be evident from FIG. 2, a can body cylinder which is to travel along path A is engaged by the side belt 42, and held thereto by the energised electromagnet A1, before its rear end has ceased to be incontact with the side belt 38.

When a can body cylinder approaches the end of its travel along path B under control of the permanent magnets 74 behind the side belt 38, it is engaged by the conveyor belt 18B; similarly a can body cylinder on path A is engaged by the other conveyor belt 18A whilst its rear end is still under the influence of the permanent magnets 76 associated with path A. The curing oven has appropriate means for maintaining the orientation of the can body cylinders once they have left the region of influence of the permanent magnets 74 or 76, but this is outside the scope of the present invention and is not described here or shown in the drawings. Similarly the side stripe applicator 2 has suitable means for maintaining body cylinder orientation.

Positioned over the path junction region 30 is a can body cylinder sensing device in the form of an electrical proximity switch 50, which is carried by a bracket 82 fixed to the baseplate 32. The proximity switch 50 is electrically coupled to the sequential control unit 80, the latter being responsive to a signal, received from the switch 50 upon arrival of the leading edge of a can body cylinder 7 at the switch 50. This signal initiates the appropriate step in the sequence of operation of the lane divider. This sequence will now be described with reference to FIG. 5.

In FIG. 5, each path A', A, B is indicated by a straight line, and a succession of three can body cylinders is denoted by the references x, y and z in that order. The five electromagnets and the sensing device 50 are also indicated. An energised electromagnet is shown hatched, a de-energised electromagnet being unhatched. The occurrence of a switching operation on an electromagnet is indicated by a broad arrow adjacent to the magnet concerned; switching to an energised state is shown by this arrow pointing towards the magnet, whilst the arrow points away from it if the switching operation is to a de-energised state. The six diagrams (a) to (f) show six successive steps in a complete cycle.

In this example, a cycle of operation consists of the conveying of two successive can body cylinders through the lane divider which passes one cylinder along path A and the next along path B. The next cylinder after that will be passed into path B, and so on. It will however be understood that the lane divider can if desired be arranged to switch paths after any predetermined number of can body cylinders has been passed along a particular downstream path, instead of using alternate paths for alternate individual cylinders.

In FIG. 5(a), body cylinder y has reached the point on path A' at which its leading edge is level with the sensing device 50, which transmits a signal accordingly to the sequential control unit 80 (FIG. 1) such that the latter causes the master electromagnet 40 to be energised. At this time the preceding can body cylinder x, travelling along path B, is held in its correct orientation by the electromagnets B1 and B2, these being accordingly in an energised state.

FIG. 5(b) shows the cylinder y having moved so that its leading edge is in the path junction area 30 (FIG. 1) opposite the master electromagnet 40. Cylinder y has now moved on, and whilst electromagnet B2 is still energised, its fellow, B1, is de-energised by the sequential control unit, so as not to influence the cylinder y, for which path A is being selected.

In FIG. 5(c), the cylinder x has moved into the region of influence of the permanent magnets 74 (FIG. 1) of path B, and electromagnet B2, being no longer required, is de-energised. At the same time, the electromagnets A1 and A2 are switched to an energised state. The cylinder y is shown at the point, discussed earlier herein, at which its leading edge just commences engagement with the side belt 42, its rear end being still held in correct orientation by the master electromagnet 40.

Further advance of the cylinder y brings its leading edge opposite to the electromagnet A1, as seen in FIG. 5(d). The master electromagnet 40 is now deenergised, to avoid the exerting a dragging effect on the cylinder y.

In FIG. 5(e), the next cylinder, z, has reached the point at which its leading edge causes the sensing device 50 to transmit a signal which again causes energisation of the master magnet 40, whilst at the same time electromagnet A1 is de-energised.

In FIG. 5(f), the sequential control unit causes energisation of the electromagnets B1 and B2 and deenergisation of electromagnet A2, ready for the diversion of cylinder z into path B by the action of the magnet B1.

It will be understood that, besides the many variations which may be adopted as discussed earlier in this Description, others are also possible. For example, the drive belt (or other suitable article-advancing means) that is common to the feed path A' and one of the other paths may be the belt 42, which will then be extended backwardly as is the belt 38 in FIG. 2. The belt 38 will then be arranged with its drive roller 60 at approximately the position at which the master electromagnet 40 is shown in FIG. 2, the latter being shifted to the other side of the junction region 30.

It is not necessarily essential to provide controllable magnets (such as electromagnets) in association with both the downstream paths A and B. Permanent magnets may be employed instead on one of the paths, provided the geometry of the paths and the relative strengths and positions of the magnets concerned do not cause such permanent magnets to influence an article selected for travel along the other path. Thus, for example, if permanent magnets are provided in place of the electromagnets A1 and A2, selection of path will be determined entirely according to whether the electromagnet B1 is energised or de-energised.

Where electromagnets along the downstream paths are provided, there may be any convenient number from one upwards.

The sequential control unit 80 may be in any convenient form; it may for example be electronic, and may be programmable to achieve any desired sequence of operation.

We claim:

1. Conveying apparatus for conveying a succession of generally cylindrical elongate articles of magnetizable material, axially end-to-end and each in a predetermined orientation about its axis, said apparatus having
a longitudinal means for guiding said cylindrical articles end-to-end and defining a single common path and a plurality of other paths forming a common junction region with the common path;
article-advancing means operatively associated with the various paths for positively driving the articles along said conveyor path, said common path and said other paths;
a controllable magnet means including a controllable master magnet at the junction region providing a magnetic field when activated, the master magnet defining a local region of influence on any said article in the junction region only;

said controllable magnet means further including at least one other controllable magnet located adjacent the entry to each said other path downstream of said master magnet and spaced from said master magnet in a position such that its local region of influence extends into the junction region;

non-changeable magnetic holding means disposed along substantially the whole length of the paths other than said controllable magnet means for exerting a generally radial force on said articles to maintain said articles in said end-to-end relationship guided by said guide means and to positively maintain each article in said predetermined rotational orientation relative to the axis of each article throughout its travel along at least said other paths through the apparatus; and sequencing means synchronized with the article-advancing means for activating and de-activating said controllable master magnet and said at least one other controllable magnet;

whereby:
(i) energization of the master magnet (40) magnetically draws a first said article (y) to said article-advancing means for advancement by said advancing means into the junction region and positions it therein, (ii) energization of a first of said other controllable magnets ($A_1$) draws the leading end of said first article (y) to said article advancing means for advancement by said advancing means into a first of said other paths (A) associated with said other controllable magnet, and de-energization of the master magnet (40) then controls the approach of the next following one (z) of said articles, and (iii) when the rear end of said first article (y) has left the junction region, re-energization of the master magnet draws the leading end of said next article (z) to said article advancing means for advancement by said advancing means into the junction region and positions it therein, and (iv) energization of a second of said other controllable magnets ($B_1$) draws the leading end of said next article (z) to said article advancing means for advancement by said advancing means into a second of said other paths (B) associated with said second other controllable magnet.

2. The apparatus according to claim 1, wherein said article-advancing means comprises a plurality of article-engaging elements movable forward to urge the articles along said paths, each of said other paths having at least one said articleengaging element, the magnetic holding means being associated with said article-advancing means so as to hold the articles in contact with the article-engaging elements.

3. The apparatus according to claim 2, being a route divider for transferring said articles from the common single path selectively to said other paths downstream of the common path, and said apparatus further including article-sensing means operatively positioned with the common single path and being coupled to the sequencing means, and wherein said article-sensing means is responsive to the arrival of the leading end of said article at said article-sensing means for initiating a signal fed to said sequencing means, and said sequencing means includes means responsive to receipt of said signal for initiating an appropriate step in said sequence.

4. The apparatus according to claim 2, wherein each of said article-advancing element is an endless member.

5. The apparatus according to claim 4, wherein a first said endless member, associated with a first downstream path, extends rearwardly so as to provide also the article-advancing means for the common path, whereby, when a said article is to travel along a selected downstream path other than said first path, said sequencing means causes the state of activation of said at least one controllable magnet to be such that the article is transferred from the first endless member to a second endless member, to be advanced thereby along the selected path.

6. The apparatus according to claim 5, wherein there is a first downstream path and a second downstream path, said second downstream path and the common path being, at least in the vicinity of the junction regions, straight and continuous with each other, said first path being divergent from said common path, and wherein said second endless member, for advancing said articles along said second path, is positioned to engage a said article selected for travel along said second path and to carry it forward so that the leading end of the article enters the local region of influence of said at least one controllable magnet of said second path while still engaged by said first endless member.

7. The apparatus according to claim 5, wherein each endless member has a course extending along the side of the corresponding path or paths so as to engage the articles laterally, said magnetic holding means being disposed immediately behind said courses of said endless members.

* * * * *